Dec. 23, 1947.                J. R. SNYDER                2,433,302
                              PUMP VALVE
                         Filed Aug. 14, 1943            3 Sheets-Sheet 2
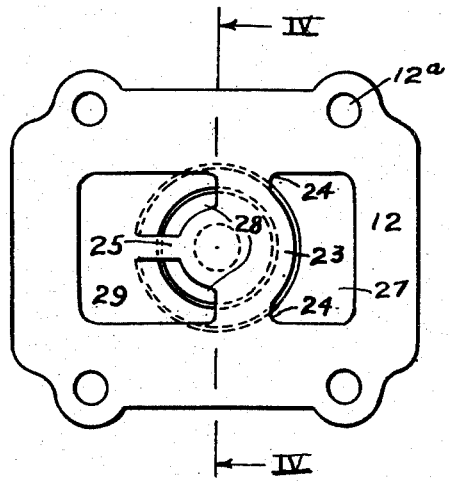
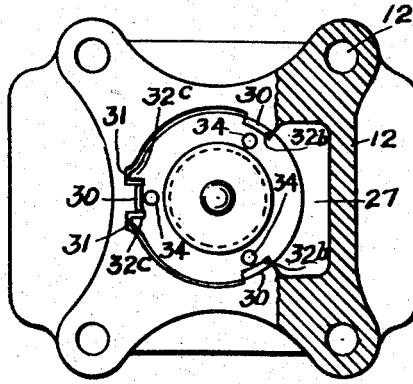
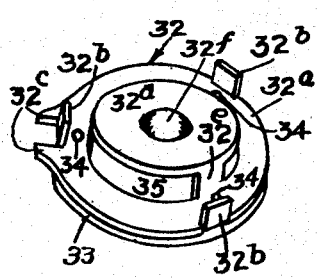
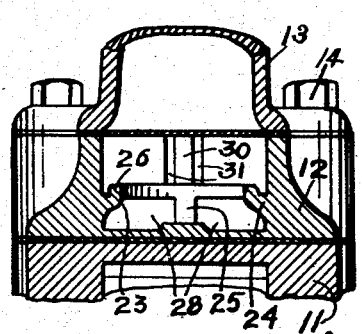
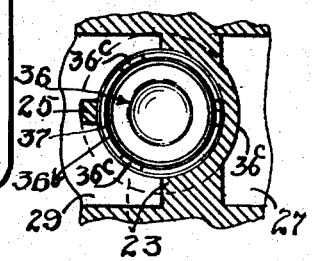
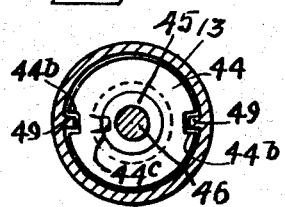
Inventor
Jacob R. Snyder
by Charles Hill Attys.

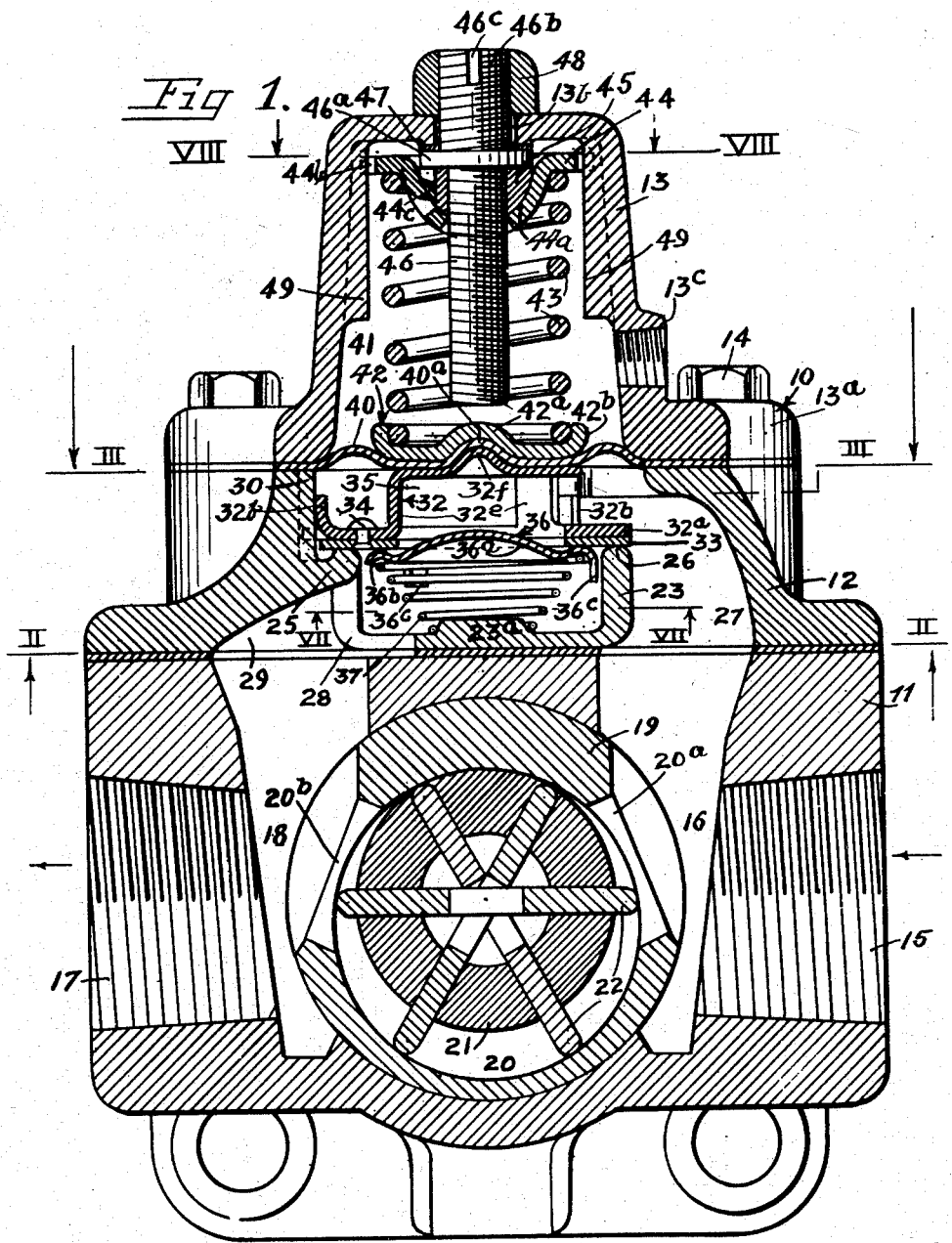

Dec. 23, 1947.  J. R. SNYDER  2,433,302
PUMP VALVE
Filed Aug. 14, 1943  3 Sheets-Sheet 3
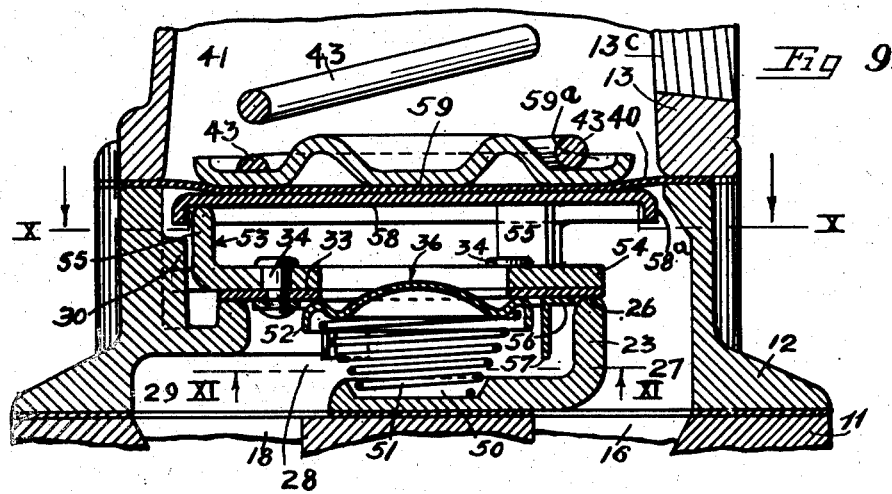
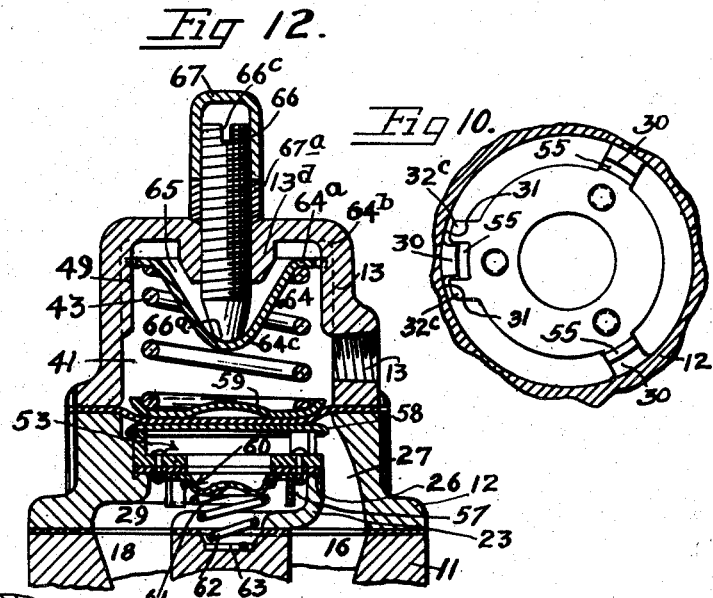
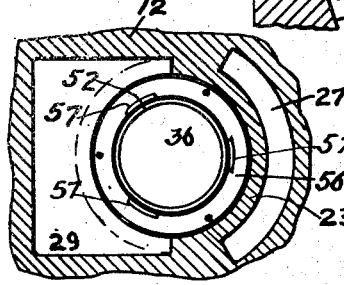
Inventor
JACOB R. SNYDER
by
Attys Patented Dec. 23, 1947

2,433,302

UNITED STATES PATENT OFFICE 2,433,302

PUMP VALVE

Jacob Rush Snyder, Cleveland, Ohio, assignor to Thompson Products, Inc., Cleveland, Ohio, a corporation of Ohio Application August 14, 1943, Serial No. 498,661

5 Claims. (Cl. 277—45)

1

This invention relates to fluid transfer devices such as pumps equipped with valves controlling flow around the devices.

Specifically the invention relates to relief and by-pass valve constructions for pumps wherein a single ring provides the seating surface for both the relief and by-pass valves.

The invention will hereinafter be specifically described as embodied in an aircraft fuel pump of the positive displacement type, but it is to be understood that the invention is not limited to such embodiments since it is generally applicable to valve assemblies.

Airplane fuel systems generally include a series or tandem arrangement of fuel pumps with at least one of the pumps being of the positive displacement type such as a rotary vane pump which is directly mounted on the airplane engine and driven by the engine. The positive displacement pumps in such systems are equipped with by-pass means so that the fuel can be received by the engine even when the pump is inoperative. Such airplane fuel systems maintain the fuel fed to the carburetor of the airplane engine at a constant pressure differential above either the ambient air pressure or the engine intake manifold pressure and therefore the positive displacement pumps in such systems are also equipped with relief valves capable of relieving excess pump pressures from the discharge to the intake side of the pump. The relief valve is spring-urged toward closed position by a spring which can be set to maintain the desired differential pressure at the discharge side of the pump and, in order to balance the relief valve against variations in inlet pressures and compensating variations in pump discharge pressure and base pressure (ambient air pressure or engine intake manifold pressure) a diaphragm is provided.

The diaphragm is interposed between the spring acting on the relief valve and the valve so that the spring acts on the valve through the diaphragm and the diaphragm will move with the relief valve. One side of the diaphragm has an effective area exposed to base pressure balanced by an equal relief valve area exposed to pump discharge pressure.

The side of the diaphragm opposite that side exposed to base pressure is exposed to inlet pressure in the pump, and the area so exposed and tending to move the relief valve in one direction is balanced by an equal area on the relief valve assembly tending to move the relief valve in the other direction.

Thus a balanced relief valve assembly is provided and the selected spring pressure acting on said assembly will determine the pump discharge pressure differential above the selected base pressure which is either the ambient air pressure or the engine intake manifold pressure.

In accordance with this invention a fuel pump is provided having a minimum number of parts each of which can be manufactured at very low cost. The housing parts of the pumps of this invention can be made from plastic material in such a manner that no machining operations are required. The operating parts of the pump of this invention can be made from stamped or pressed metal without requiring special and expensive machining operations.

The relief valve and by-pass valve constructions of this invention are simple, inexpensive, and embody a single ring of rubber-like material which forms the seating face on the relief valve as well as a seat for the by-pass valve. This single piece of material can be attached to the relief valve. The relief valve itself is made from a single piece of stamped or pressed sheet metal.

The by-pass valve is made from a single piece of stamped or pressed sheet metal and seats on the rubber-like seating ring carried by the relief valve.

The pump casing preferably includes an intermediate cast or molded housing portion forming a seat and guides for the relief valve. If this part is made of plastic material, no machining operations are necessary. If the part is made of cast metal such as aluminum, the machining work is simple and inexpensive since only turning operations are necessary.

The casing further includes a cap defining a spring chamber which cap can be made of plastic material without any machining operation.

A feature of the invention is the provision of an improved adjusting screw mechanism for the coil spring which acts on the diaphragm for urging the relief valve toward closed position. This improved adjusting mechanism includes a spring retainer tiltably mounted on an adjusting member so that the coil spring will always exert an even selected pressure on the relief valve.

It is, then, an object of this invention to provide a valve construction embodying a plurality of valves wherein a single member forms a seating surface for all of the valves.

A further object of the invention is to provide a by-pass and relief valve construction for fluid transfer devices wherein the relief valve carries a member forming the seating surface for the valve and also forming the seat for the by-pass valve.

A still further object of the invention is to provide a relief valve and by-pass valve assembly for fluid transfer devices wherein a single flat piece of plastic material such as, for example, synthetic rubber, forms the seating face of the relief valve and the seat for the by-pass valve.

A still further object of the invention is to provide a relief valve composed of a single piece of stamped or pressed sheet metal carrying a flat ring of rubber-like material to form the seating face therefor.

A still further object of the invention is to provide a by-pass and relief valve assembly for aircraft fuel pumps which has high capacity and involves the use of inexpensive, simple parts.

A still further object of the invention is to provide a spring-urged relief valve assembly for fluid transfer devices wherein uneven spring pressures are automatically compensated.

Another object of the invention is to provide a spring mounting assembly for a valve construction wherein the spring load is readily adjusted through a pivotally supported spring retainer.

A further object of the invention is to provide a relief valve and by-pass valve assembly for fuel pumps wherein a single flat ring of synthetic rubber material hermetically seals both valves and increases the efficiency of the assembly over assemblies utilizing a plurality of seating faces or metal seating faces.

Other and further objects of the invention will be apparent to those skilled in the art from the following detailed description of the annexed sheets of drawings which, by way of preferred examples only, illustrate several embodiments of the invention.

On the drawings:

Figure 1 is a longitudinal vertical cross-sectional view of a rotary vane fuel pump equipped with one form of by-pass and relief valve assembly according to this invention.

Figure 2 is a bottom plan view of a part of the pump shown in Figure 1 taken along the line II—II of Figure 1.

Figure 3 is a top plan view with a part in horizontal cross section, taken along the line III—III of Figure 1.

Figure 4 is a vertical cross-sectional view, with parts in elevation and with parts omitted, taken along the line IV—IV of Figure 2.

Figure 5 is a perspective view of the relief valve shown in Figure 1.

Figure 6 is a vertical cross-sectional view of a semi-ball member forming the pivotal support for the spring retainer of Figure 1.

Figure 7 is a horizontal cross-sectional view taken along the line VII—VII of Figure 1.

Figure 8 is a horizontal cross-sectional view taken along the line VIII—VIII of Figure 1.

Figure 9 is a fragmentary vertical cross-sectional view of a fuel pump having a modified by-pass valve and relief valve assembly.

Figure 10 is a horizontal cross-sectional view taken along the line X—X of Figure 9.

Figure 11 is a horizontal cross-sectional view taken along the line XI—XI of Figure 9.

Figure 12 is a fragmentary vertical cross-sectional view of a fuel pump having a modified adjustable spring assembly for the relief valve.

As shown on the drawings:

In Figure 1 the reference numeral 10 designates generally a fuel pump including an open-topped pump casing 11, an open-ended valve casing 12, and an open-bottomed spring casing 13, all held together in superimposed relation by means of bolts or studs 14 extending through an outturned flange 13a of the casing 13, completely through apertures 12a (Figures 2 and 3) in the valve casing 12, into tapped wall portions of the pump casing 11.

The pump casing 11 has an internally threaded inlet 15 communicating with an inlet chamber 16 therein. The casing 11 also has an internally threaded outlet 17 communicating with a pump discharge chamber 18 therein.

A sleeve or liner 19 is pressed into the casing 11 between the inlet chamber 16 and the discharge chamber 18 and defines, with its inner surface, a pumping chamber 20 communicating through a port 20a in the sleeve with the inlet chamber 16, and also communicating through a port 20b in the sleeve 19 with the discharge chamber 18.

A rotor 21 is eccentrically mounted for rotation within the sleeve 19 and has sliding vanes cooperating with the inner surface of the sleeve to pump material from the inlet port 20a to the outlet port 20b and thus circulate material from the inlet 15 to the outlet 17 of the pump.

As shown in Figures 1 and 2, the valve casing 12 is hollow and has an integral open-topped cup 23 carried in the central portion thereof by means of integral webs or flanges 24 extending inwardly from the side walls of the casing at the bottom thereof together with a rib 25 extending inwardly from an end wall of the casing to the top of the cup. The cup 23 has an annular rim around the open top end thereof providing a valve seat 26 intermediate the top and bottom of the casing 12.

The open top of the cup 23 communicates through a passageway 27 with the inlet chamber 16 of the casing 11.

Ports 28 are provided in the bottom and one side of the cup 23 to join the interior of the cup with a passageway 29 communicating with the outlet chamber 18 of the casing 11.

As shown in Figure 3, the open top of the casing 12 has three inwardly projecting bosses 30 spaced equally therearound with one of the bosses having a keyway 31 on each side thereof.

A relief valve 32, best shown in Figure 5, composed of a single piece of stamped or pressed metal has a flat annular flange 32a therearound with three upstanding tangs 32b adapted to be slidably guided by the bosses 30. Fingers or keys 32c are provided on the flange 32a on each side of one tang 32b to straddle the boss 30 cooperating with this tang 32b and to project into the keyways 31.

The flange 32a is bottomed by a ring 33 of fuel-resisting plastic material such as synthetic rubber. This ring 33 is secured to the flange 32a by means of rivets 34 although it should be understood that any bonding means could be used. For example, the ring 33 could be vulcanized or cemented to the flange 32a.

As shown in Figure 1, the ring 33 cooperates with the seat 26 to provide a valve for the seat.

The member 32, as best shown in Figure 5, has a central raised portion 32d with ported side walls 32e connected to the inner edge of the flange 32a. Ports 35 are thus provided through the valve piece 32.

The central portion of the raised part 32d is pressed upwardly to provide a rounded button projection 32f.

As shown in Figure 1, the relief valve 32 has the rubber ring 33 carried thereby seated on the seat 26 provided by the cup 23 but the interior of the relief valve 32 is in communication through the ports 35 with the passageway 27.

A by-pass valve 36 composed of a single piece of stamped or pressed metal has a raised central dome portion 36a projecting through the aperture provided by the ring 33 and the flange 32a of the relief valve 32 surrounded by an annular bead 36b seated on the ring 33 and sealing the interior of the cup 23 from the interior of the relief valve 32.

As shown in Figures 1 and 7, three tangs or legs 36c depend from the beaded rim 36b and have operating clearance with the inner side wall of the cup 23. A conical coil spring 37 has the large end coil thereof seated in the beaded rim 36b and the small end coil thereof surrounding a raised boss portion 23a on the bottom of the cup 23. The spring 37 urges the by-pass valve 36 against the seating surface of the relief valve 32 provided by the ring 33. Thus, the ring 33 forms the seating surface for the relief valve 32 and cooperates with the valve seat 26 and also forms the valve seat for the by-pass valve 36.

The straddling key and keyway relationship provided by the keyways 31 alongside a boss 30 of the casing 12 and the keys 32c of the relief valve 32 prevents rotation of the relief valve 32 relative to the casing but permits the valve to move toward and away from the seat 26 while guided by the tangs 32b. These tangs prevent cocking or tilting of the valve relative to the casing.

The spring 37 holds the by-pass valve 36 against the seating ring 33 and this by-pass valve 36 is adapted to move with the relief valve without opening the passage through the relief valve.

In the event that the inlet pressure in the chamber 16 of the pump is greater than the outlet pressure in the chamber 18 of the pump, fuel can flow through the passageway 27 into the relief valve 32 against the top of the by-pass valve 36 to force this by-pass valve off of the ring 33 and downwardly into the cup where it will be guided against cocking or tilting by the tangs 36c and the inner face of the cup. The fuel is then passed through the ports 28 of the cup and passageway 29 into the chamber 18. Thus fuel can be by-passed around the pumping chamber 20 whenever inlet pressure is greater than outlet pressure.

Normally, the pump, when operating, delivers fuel in amounts greater than those amounts demanded by the engine and fuel must be relieved from the outlet chamber 18 back to the inlet chamber 16. This relief of fuel is automatically accomplished to maintain the outlet pressure of the pump at a predetermined pressure differential, based on engine intake manifold pressure or ambient air pressure, by subjecting the relief valve to discharge pressure through the passageway 29 and ports 28. The discharge pressure will tend to lift the relief valve 32 off the seat 26 and relieve fuel into the passageway 27 back to the inlet chamber 16.

In order that a predetermined pressure differential can be maintained by the pump, based on a selected base pressure such as ambient air pressure or engine intake manifold pressure, a flexible diaphragm 40 composed of a sheet of synthetic rubber, synthetic rubber-impregnated fabric, or similar material is interposed between the valve casing 12 and the spring casing 13 to separate a spring chamber 41 from the interior of the casing 12. The diaphragm 40 is clamped around the periphery thereof between the outturned flange 13a of the spring casing 13 and the top of the valve casing 12.

A spring retainer 42 is mounted in the spring chamber 41 and has a central raised portion 42a providing a rounded recess to receive a central humped-up portion 40a of the diaphragm 40 which portion 40a is disposed over the rounded button portion 32f of the relief valve 32. The center of the diaphragm 40 is thus clamped between the raised portion 32f of the relief valve and the raised portion 42a of the spring retainer.

The spring retainer 42 has an upturned peripheral flange 42b snugly receiving therein the bottom coil of a cylindrically coiled spring 43. The upper coil of the spring 43 is seated against a top spring retainer 44. This retainer 44 has a semi-spherical recess 44a in the central portion thereof receiving an internally threaded semi-ball member 45. The ball member 45 is threaded on a stud 46 having an outturned collar 46a with a gasket 47 thereon bottomed on the top wall of the casing 13. An enlarged diameter portion 46b of the stud projects freely through an opening 13b in the top wall of the casing 13 and receives a nut 48 therearound adapted to be bottomed on this top wall of the casing 13.

The top of the stud has a screwdriver slot 46c therein.

As best shown in Figure 6, the semi-ball member 45 has a vertical keyway or slot 45a through one side thereof.

As best shown in Figures 1 and 8, the casing 13 has vertical keys 49, 49 formed integrally along the side walls thereof projecting into notches 44b, 44b of the retainer 44. A tang 44c is struck inwardly from the recess-defining portion 44a of the retainer 44 into the keyway 45a of the ball member.

The retainer 44 is thus held against rotation in the casing 13 but can move in the casing toward and away from the retainer 42. The ball member 45 is held in keyed relation to the retainer 44 and cannot rotate.

When it is desired to adjust the pressure of the spring 43 on the diaphragm 40, the nut 48 is loosened from the portion 46b of the stud 46, a screwdriver is inserted in the slot 46c, and the stud 46 is rotated. This rotation of the stud will either raise or lower the ball member 45 along the length of the stud in the casing 13 and the spring retainer 44 is thus moved toward or away from the spring retainer 42. When the proper adjustment has been made, the nut 48 is tightened on the portion 46b against the top wall of the casing 13 and draws the shoulder 46a upwardly so that the gasket 47 will seal the bore 13b and further rotation of the stud will be prevented.

The retainer 44 is free to rock on the ball member 45 so that unequal spring pressures will always be compensated and the spring 43 will exert an even pressure around its entire bottom end coil on the retainer 42. It should be noted from Figure 1 that the notches 44b of the retainer extend inwardly beyond the inner ends of the keys 49 to permit rocking of the retainer.

The casing 13 has a boss 13c in the side wall thereof adapted to be vented either to the ambient air or to the engine intake manifold so that the chamber 41 will be at a base pressure determined either by the ambient air or by the engine intake manifold pressure.

Since the diaphragm 40 is clamped between the top of the relief valve 32 and the spring retainer 42, this diaphragm 40 must move whenever the relief valve moves. The diaphragm 40 has an effective area exposed to the base pressure in the spring chamber 41 balanced by an equal relief valve area exposed to pump discharge pressure through the passageway 29 and ports 28. In addition, the effective area of the diaphragm exposed to pump inlet pressure and tending to move the relief valve assembly in one direction is balanced by an equal area on the valve assembly tending to move the assembly in the opposite direction.

The assembly of this invention is, therefore, balanced against compensating variations in base and pump discharge pressure as well as variations in inlet pressures, and will maintain a selected pump discharge pressure differential above a selected base pressure. The pressure of the spring 43 will determine this differential and, as explained above, the spring pressure can be manually set by the stud 46.

In the modification of Figures 9 to 11, parts substantially identical with parts described in connection with Figures 1 to 8 have been marked with the same reference numerals. As shown in Figure 9, however, the rib 25 is not present and the cup 23 is formed as an annulus providing the valve seat 26. A single port 28 joins the interior of the cup with the passageway 29. The bottom of the cup, instead of having the raised boss as in Figure 1, has a recess 50 receiving the small end coil of a conical coil spring 51. The by-pass valve 36 has a continuous dependent skirt 52 therearound instead of the three tangs 36c.

A different type of relief valve 53 is provided. This relief valve 53 is in the form of a flat metal ring 54 having three upstanding legs 55 at equally spaced intervals therearound. These legs 55, as shown in Figure 10, cooperate with the bosses 30 of the casing 12 to slidably guide the relief valve and prevent the same from tilting or cocking relative to the seat 26. The seating ring 33 is riveted to the bottom face of the ring 54 by means of the rivets 34 and these rivets 34 also carry a ring 56 having three depending legs 57, as shown in Figure 11, spaced equally therearound and serving to guide the skirt 52 of the by-pass valve 36 to prevent this by-pass valve from tipping as it is moved away from the seat ring 33.

A diaphragm support 58 composed of a metal disk with a downturned skirt 58a around the periphery thereof is seated on the legs 55 of the relief valve 53.

A spring retainer 59 rests on top of the diaphragm 40 and has an annular trough 59a therearound receiving the bottom coil of the spring 43.

The by-pass and relief valve assembly operates the same as described in connection with Figures 1 to 8, but the relief valve is composed of a more simple stamping carrying a separate diaphragm support and also carrying a separate guide member for the by-pass valve 36.

In the modification of Figure 12, parts substantially identical with parts described in Figures 1 to 8 have been marked with the same reference numerals and the relief valve assembly 53 is substantially the same as shown in Figure 9. A somewhat different shaped by-pass valve 60 is used. This valve 60 is a metal disk with a depressed central portion extending into the cup 23 and providing an annular shoulder receiving the large end coil of a conical spring 62 therearound. The bottom of the cup 23 is apertured and the spring 62 extends through this aperture into a well 63 of the pump casing 11. The spring 62 is bottomed in the well 63.

A different type of top spring retainer is used. As shown in Figure 12, a top spring retainer 64 has an outturned peripheral flange 64a with notches 64b therein receiving the keys 49 of the casing 13. The retainer 64 has a depressed central portion providing an open-topped well 65 converging to a rounded bottom 64c on the retainer.

A stud 66 is threaded through an internally threaded hollow boss portion 13d of the casing 13 and has a rounded end 66a seating on the bottom 64c of the retainer. The stud 66 projects above the top of the casing 13 and has a screwdriver slot 66c in the top end thereof for rotation of the stud to move it further into or further out of the spring chamber 41. The stud thus acts on the central portion of the retainer 64 and this retainer is adapted to tilt or cock in the casing 13 so that an even spring pressure will be exerted around the periphery of the bottom retainer 59.

A cap 67 is adapted to be threaded around the projecting portion of the stud 66 with a lock nut 67a bottomed on the top wall of the casing 13 to seal the chamber 41.

From the above descriptions it should be understood that the invention provides a simplified, inexpensive by-pass and relief valve assembly for pumps or the like wherein a single ring of plastic material such as synthetic rubber, synthetic rubber-impregnated fabric, or the like, forms the seating face for the relief valve as well as the seat for the by-pass valve. It will also be understood that the invention provides a relief and by-pass valve construction wherein simple, inexpensive stamped metal parts are used exclusively. The invention further provides an improved spring-adjusting mechanism for the relief valve wherein the spring pressure is always uniformly applied.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A relief valve for pumps comprising a metal cup having an outturned flange around the mouth thereof, guide means around the periphery of said flange, a ring of seating material secured to said flange to form a seating face on the cup, and said cup having ports in the side wall thereof.

2. A relief and by-pass valve assembly comprising a stamped metal cup having an outturned flange around the mouth thereof, seating material secured to said flange, said cup having ports in the side wall thereof, and a disk for closing the mouth of said cup having an annular seating surface cooperating with the seating material on said cup.

3. A relief and by-pass valve assembly comprising a stamped metal cup having an outturned flat flange around the periphery thereof, said flange having a guide portion on the periphery thereof, a ring of synthetic rubber material covering said flange, said cup having ports in the side wall thereof, the closed end of said cup having a localized domed portion at the center thereof, and a disk member having an annular seating surface cooperating with said ring inwardly of the periphery thereof.

4. A relief and by-pass valve assembly comprising a metal ring having upturned legs at spaced intervals around the periphery thereof, a second metal ring having downturned legs at spaced intervals therearound, a ring of seating material between said rings and having exposed inner and outer marginal portions, a valve seat cooperating with the outer marginal portion of said seating material, and a by-pass valve cooperating with the inner marginal portion of said seating material to close the opening through said rings.

5. A relief and by-pass valve assembly comprising a casing having a passageway therethrough with an annular valve seat therein, inwardly projecting bosses in said casing, a relief valve having guide portions adjacent said bosses to hold the valve against cocking in the casing, said relief valve having means projecting therefrom in straddling relation with a boss to hold said valve against rotation relative to the casing, a seating face on said valve cooperating with said valve seat, and a by-pass valve cooperating with said seating face.

JACOB RUSH SNYDER.

REFERENCES CITED

The following references are of record in the file of this patent:

UNITED STATES PATENTS

| Number | Name | Date |
|---|---|---|
| 2,294,609 | Schlosser | Sept. 1, 1942 |
| 2,299,079 | Davis | Oct. 20, 1942 |
| 2,291,424 | Wichorek | July 28, 1942 |
| 2,268,695 | Carlson | Jan. 6, 1942 |
| 2,196,500 | Johnson | Apr. 9, 1940 |
| 1,889,517 | Roessler | Nov. 29, 1932 |
| 2,266,314 | Esbaugh | Dec. 16, 1941 |
| 2,299,367 | Webb | Oct. 29, 1942 |
| 2,157,571 | Retschy | May 9, 1939 |
| 2,265,629 | Christiansen | Dec. 9, 1941 |
| 1,974,274 | Hopkins | Sept. 18, 1934 |
| 61,199 | Hooker | Jan. 15, 1867 |
| 1,003,479 | Lucas | Sept. 19, 1911 |
| 259,109 | Duchemin | June 6, 1882 |
| 2,088,226 | Arvintz | July 27, 1937 |
| 2,191,614 | Frantz | Feb. 27, 1940 |
| 2,353,545 | Caserta | July 11, 1944 |
| 1,467,440 | Lumb | Sept. 11, 1923 |
| 2,011,837 | Whitted | Aug. 20, 1935 |
| 1,841,354 | Bowen | Jan. 19, 1932 |
| 1,985,936 | Loweke | Jan. 11, 1935 |
| 310,459 | Nicholson et al. | Jan. 6, 1885 |